Aug. 25, 1959     J. M. FENNER     2,900,785
SIX-WIRE STRAND
Filed May 18, 1956

INVENTOR:
JAMES M. FENNER,
BY: Donald G. Dalton
his Attorney.

United States Patent Office 2,900,785
Patented Aug. 25, 1959

2,900,785

SIX-WIRE STRAND

James M. Fenner, Chagrin Falls, Ohio, assignor to United States Steel Corporation, a corporation of New Jersey Application May 18, 1956, Serial No. 585,662

7 Claims. (Cl. 57—153)

This invention relates to a cord and to an article containing the same and more particularly to a steel cord which is embedded in a rubber article such as an automobile tire or belting. It is common practice to use cord especially in large truck tires. For best performance there should be a good bond between the rubber and the cord and the fatigue resistance should be great. Various types of cords have been tried for this purpose but none have been satisfactory from all view points. If the fatigue resistance is good the bond may be poor or the cost of the cord may be excessive.

It is therefore an object of my invention to provide a cord which is inexpensive to manufacture.

Another object is to provide such a cord which when embedded in a rubber article will have high fatigue resistance, good bond and minimum weight.

These and other objects will be more apparent after referring to the following specification and attached drawings, in which.

Figure 1:
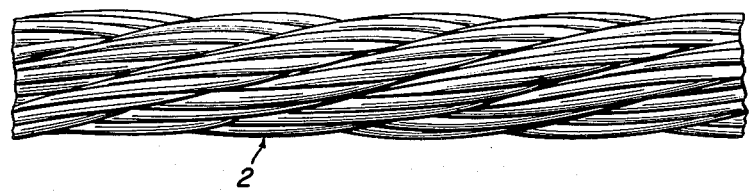
Figure 1 is a longitudinal view of the cord of my invention.
Figure 2:
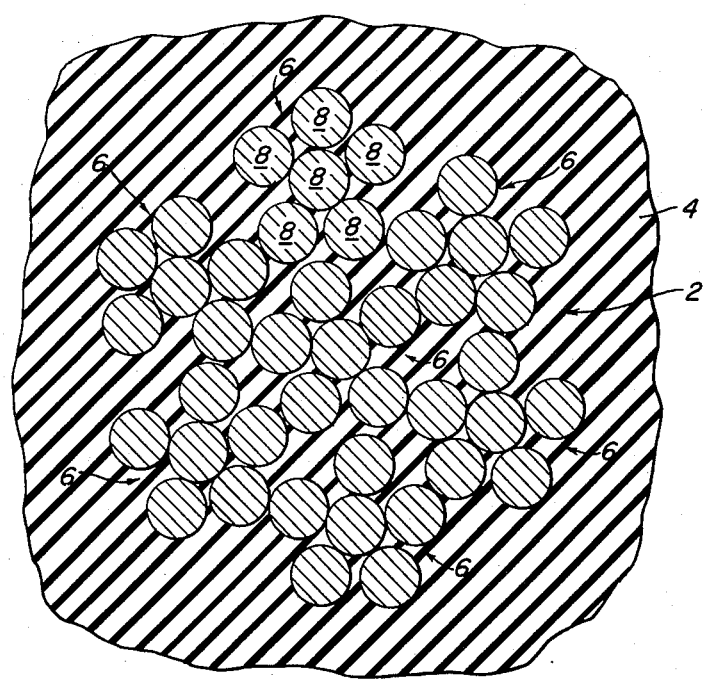
Figure 2 is an enlarged cross-sectional view showing the cord embedded in a rubber article.

Referring more particularly to the drawings, reference numeral 2 indicates the cord of my invention which is embedded in a rubber article 4. It will be seen that the rubber has flown readily into the interstices of the cord. The cord consists of seven strands 6. Each strand 6 consists of six wires 8 which are twisted or bunched together rather than being laid in a conventional manner. In bunching each of the wires 8 will be on the outside of the strand over part of its length. In other words there is no wire which acts as a center core over the entire length of the strand as generally provided in such cords. In the manufacture of a strand in long lengths all of the wires will be of the same length but it does not necessarily follow that the wires in a shorter length will all be of the same length. The strands are laid up in the usual manner, that is, one forms the core and the others are helically laid around the core. The lay of the wires in the strand is opposite to the lay of the strand in the cord. For example, if the wires are right hand lay the strands will be left hand lay. The lay of both the wires and strands is preferably long; for example, the lay of the strands should be at least 15 times the diameter of the strand making up the cord. The wires are made of metal, preferably steel. I have found that this cord can be made faster and cheaper than conventional cords and that the weight of the cord required in a tire is less than that required by the conventional cord. Also, because of the construction it appears that it is easier for the rubber to get into the interstices, thus giving a better bond and increased fatigue resistance. If desired the strands may be used in the rubber article without being laid up in a cord.

While one embodiment of my invention has been shown and described it will be apparent that other adaptations and modifications may be made without departing from the scope of the following claims.

I claim:

1. A cord comprising seven 6-wire strands, each strand consisting of six wires twisted together with each wire being on the outside of the strand over part of its length, one of said strands forming a center core for the cord and the remaining strands being laid helically around the core.

2. A cord according to claim 1 in which the lay of the wires in the strand is opposite to the lay of the strands in the cord.

3. An article comprising a metallic strand embedded in rubber with the rubber extending into the interstices of said strand, said strand consisting of six individual wires twisted together with each wire being on the outside of the strand over part of its length.

4. An article comprising a metallic cord embedded in rubber with the rubber extending into the interstices of said cord, said cord including seven 6-wire strands, each strand consisting of six wires twisted together with each wire being on the outside of the strand over part of its length, one of said strands forming a center core for the cord and the remaining strands being laid helically around the core.

5. An article according to claim 4 in which the lay of the wires in the strand is opposite to the lay of the strands in the cord.

6. An article comprising a metallic cord embedded in rubber with the rubber extending into the interstices thereof, said cord comprising a plurality of 6-wire strands, each of said strands consisting of six individual wires twisted together with each wire being on the outside of the strand over part of its length.

7. A fatigue resistant, rubber reenforcing cord comprising a plurality of 6-wire strands, each of said strands consisting of six individual metal wires twisted together with each wire being on the outside of the strand over part of its length.

References Cited in the file of this patent

UNITED STATES PATENTS

| | | |
|---|---|---|
| 587,764 | Short | Aug. 10, 1897 |
| 1,727,971 | Ford | Sept. 10, 1929 |
| 2,277,145 | Pierce | Mar. 24, 1942 |
| 2,372,142 | Warren | Mar. 20, 1945 |
| 2,401,291 | Smith | May 28, 1946 |

FOREIGN PATENTS

| | | |
|---|---|---|
| 125,971 | Australia | Oct. 16, 1944 |
| 450,937 | Great Britain | July 24, 1936 |
| 540,886 | Great Britain | Nov. 4, 1941 |